H. W. BROWN.
ELECTRICAL PROTECTIVE DEVICE.
APPLICATION FILED MAR. 18, 1914.
1,286,221.
Patented Dec. 3, 1918.
2 SHEETS—SHEET 1.
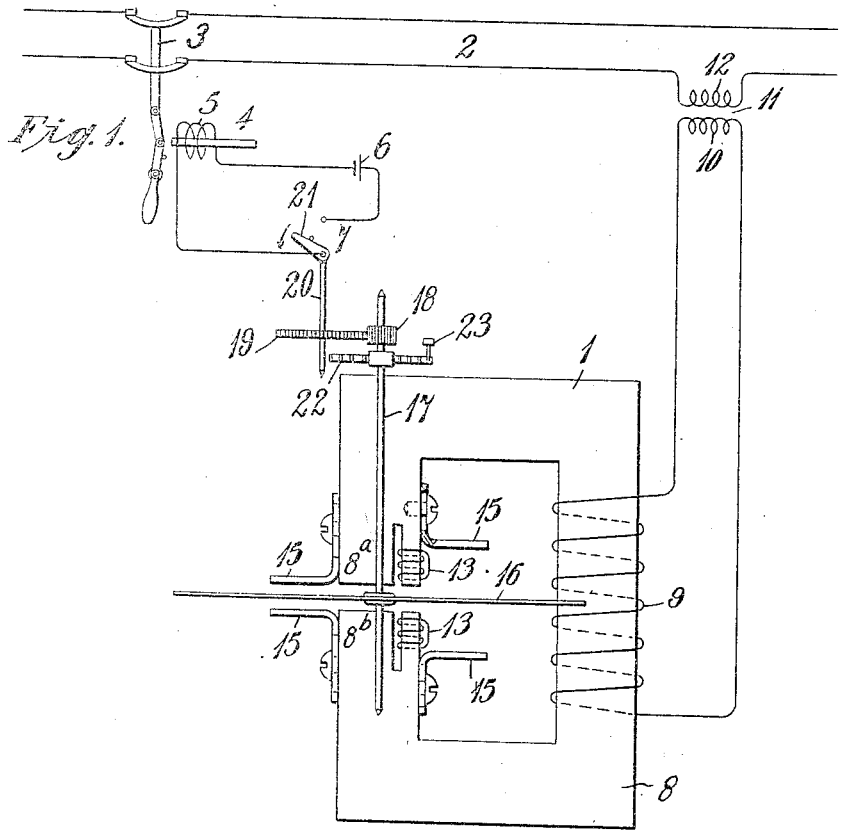
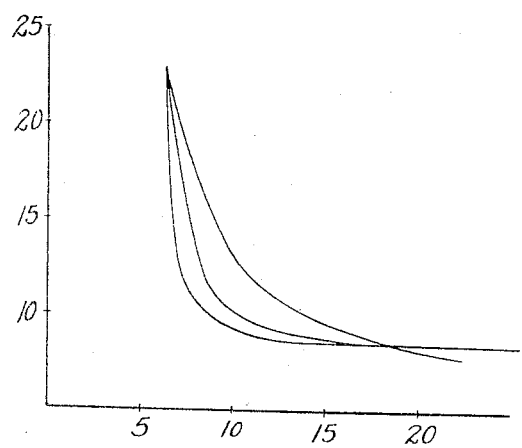

H. W. BROWN.
ELECTRICAL PROTECTIVE DEVICE.
APPLICATION FILED MAR. 18, 1914.

1,286,221. Patented Dec. 3, 1918.
2 SHEETS—SHEET 2.

WITNESSES:
Fred H Miller
R. J. Ridge

INVENTOR
Harold W. Brown
BY
Wesley G. Carr
ATTORNEY

UNITED STATES PATENT OFFICE.

HAROLD W. BROWN, OF ITHACA, NEW YORK, ASSIGNOR TO WESTINGHOUSE ELECTRIC AND MANUFACTURING COMPANY, A CORPORATION OF PENNSYLVANIA.

ELECTRICAL PROTECTIVE DEVICE.

1,286,221.     Specification of Letters Patent.     Patented Dec. 3, 1918.

Application filed March 18, 1914. Serial No. 825,448.

*To all whom it may concern:*

Be it known that I, HAROLD W. BROWN, a citizen of the United States, and a resident of Ithaca, in the county of Tompkins and State of New York, have invented a new and useful Improvement in Electrical Protective Devices, of which the following is a specification.

My invention relates to electric motors and particularly to the use of the same as protective relays.

The object of my invention is to provide a relay of the motor type which has a large range of speed control, thus allowing either a definite, or an inverse, time limit in its operation.

Heretofore, motor type relays have been provided that embodied a definite and an inverse time limit in their operation, but the definite time limit feature was only effective over a very limited range. To obviate the hereinbefore mentioned disadvantage, I provide my invention, as hereinafter described.

Figure 2:
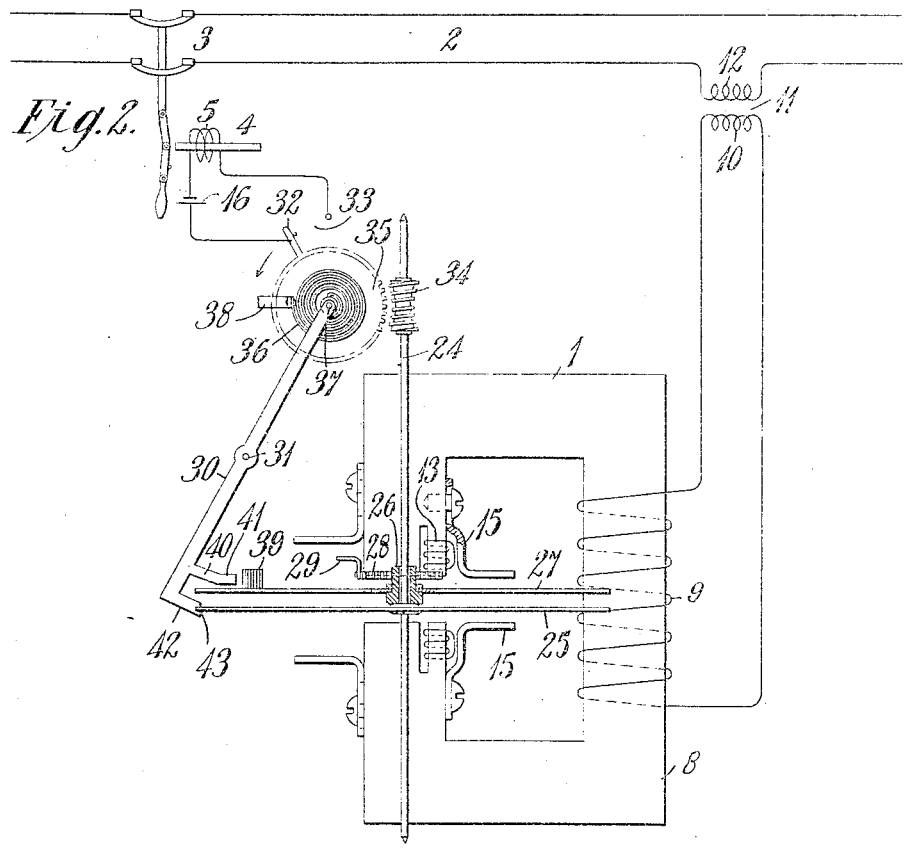
Figure 3:
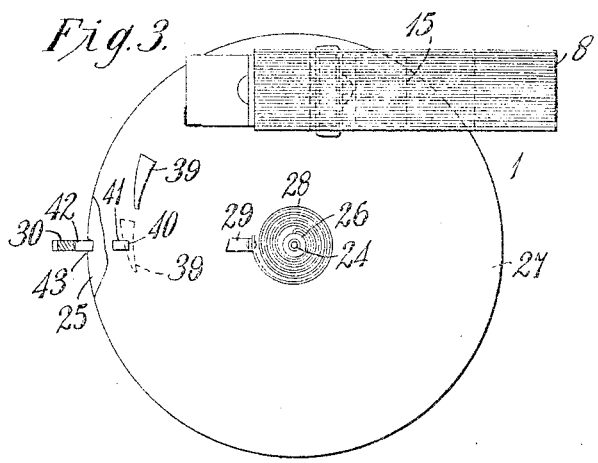

Figure 1 of the accompanying drawings is a diagrammatic view, mainly in elevation, of a relay embodying my invention, Fig. 2 is a diagrammatic view, partially in elevation and partially in section of a modified form of a relay embodying my invention, Fig. 3 is a view partially in plan and partially in section of a portion of the relay shown in Fig. 2, and Fig. 4 is a diagram showing the relative torque curves obtainable with my invention.

Referring to Fig. 1 of the drawings, a relay 1 embodying my invention serves to control the operation of a circuit interrupter 3 that is utilized to open a circuit 2 when overloaded. The circuit interrupter 3 is tripped by an electromagnet 4, the winding 5 of which is connected in series relation to a battery 6 and a switch 7. The relay 1 comprises a magnetizable core 8 having polar projections 8a and 8b, a main winding 9 that is connected in circuit with the secondary winding 10 of a transformer 11, the primary winding 12 of which is connected in series with one conductor of the circuit 2, one or more auxiliary windings 13, adjustable auxiliary pole pieces 15 that project laterally from the main pole pieces or polar projections and a rotatable armature member 16.

I have shown each of the pole pieces 8a and 8b between which the armature 16 projects and operates as divided to form two polar projections of unequal size, the smaller of which is surrounded by an auxiliary closed-circuit winding 13, and I have also shown each main pole piece as provided with two oppositely disposed laterally projecting pole pieces 15 that are so mounted as to be adjustable toward and away from the armature, but it will be understood that the structure may be variously modified, as regards the number and character of polar projections, laterally projecting pole pieces and auxiliary coils. It will further be understood that, for certain operating conditions, a single polar extension on each side of the armature may suffice and also that, in some cases, both auxiliary coils may be omitted. The armature 16 is mounted upon a shaft 17 that also carries a pinion 18 which engages a gear wheel 19 that is mounted upon a shaft 20 upon which the movable member 21 of the switch 7 is also mounted. The inner end of a spring 22 is attached to the shaft 17 and its outer end is attached to a stationary member 23.

When a predetermined overload occurs upon the circuit 2, my invention operates as follows:

Sufficient current flows through the winding 9 to cause the windings 13 to become effective and a shifting field is set up that causes the armatures 16 to turn the shaft 17, the pinion 18 and the gear wheel 19 to close the switch 7, thus completing a circuit through the winding 5 of the electromagnet 4 to trip the circuit interrupter 3. By placing the auxiliary pole pieces 15 in such positions as to cause them severally to become saturated to any desired degree when an excessive current flows through the winding 9, the resulting redistribution of the magnetic flux and eddy currents in the armature will cause the same to have a resulting speed which will be essentially the same at a large overload as at smaller overloads. However, the members 15 may be so arranged as to provide a substantially inverse time element for the rotating armature 16 of the relay 1.

When the overload on the circuit 2 is relieved, the spring 22, which has been placed under tension, causes the shaft 17 and the armature 16 to rotate backwardly to their initial positions, thus opening the switch 7, in a manner that is familiar to those versed in the art.

It will be understood that the projection 15 on the pole portion 8ᵃ is so placed that it saturates when a relatively large current traverses the coil 9 and the other projection 15 that is mounted adjacent the winding 13 is so located that it does not saturate. Thus, the differential effect causes the resultant torque to be less than if the iron of the core was not separated. In other words, the resultant torque may be stated in a formula to be A—B where A is the effect of the projections on the portions 8ᵃ and the effect of the portions 8ᵃ and 8ᵇ and B is the effect of the projections 15 on the other portions of the core.

Referring now particularly to Figs. 2 and 3 of the drawings, my device, as here shown, comprises a relay 1 having a main winding 9, auxiliary windings 13, laterally projecting pole pieces 15, substantially as shown in Fig. 1 and susceptible of modifications as set forth in the description of what is shown in that figure, a shaft 24, an armature member 25 mounted upon the same, a sleeve 26 loosely mounted upon the shaft 24, an armature member 27 mounted upon the said sleeve, a spring 28 having its inner end attached to the sleeve 26 and its outer end to a stationary member 29, and a lever member 30. The lever member 30 is pivotally mounted upon a stationary member at a point 31 intermediate its ends. The lever 30 controls the movable member 32 of a switch 33 that is actuated by the relay 1, through a worm screw 34 which is mounted on the shaft 24 and which engages a worm wheel 35 that is in operative relation to the member 32. The inner end of a spring 36 is attached to a shaft 37 upon which is mounted the worm wheel 35 and the member 32, and its outer end is attached to a stationary member 38, substantially as shown. A projection 39 is mounted upon the armature member 27, and the lever 30 is provided with a projection 40 near its lower end having a cam face 41 for engaging the projection 39. A second projection 42 upon the lever 30 engages a notch 43 in the periphery of the armature member 25, for purposes hereinafter set forth.

When sufficient current flows through the winding 9, the armature 27 is caused to rotate by reason of the eddy currents set up therein by the field adjacent thereto, as is known by those versed in the art. The projection 39 is thus moved into engagement with the projection 40 to withdraw the projection 42 from the notch 43 and to throw the worm wheel 35 into engagement with the worm screw 34. When the armature 25 is thus released, it rotates to drive the shaft 24, worm screw 34, and worm wheel 35 to close the switch 33, and thereby insure the operation of the circuit breaker 3.

When the circuit 2 has been relieved from its overload, and the current in the winding 9 falls below the predetermined value required to rotate the armatures 25 and 27, the spring 28 rotates the armature 27 to its initial starting position and permits the lever 30 to turn upon its pivot in such manner as to effect engagement of the projection 42 with the notch 43 in the periphery of the armature 25 and disengagement of the worm screw 34 from the worm wheel 35. The spring 36, which is tensioned during the closing operation of the switch 33, is thus released to return movable contact member 32 to its initial open-circuit position.

Thus, when the overload is removed from a circuit that is protected by the modification of my invention shown in Figs. 2 and 3 of the drawings, a substantially instantaneous resetting is achieved by reason of the fact that the armatures do not have to retrace their forward motion in resetting the switch 33.

By modifying the positions of the lateral pole pieces 15, the overload torque curves may be modified from a definite time limit to a marked inverse time limit effect, as shown in Fig. 4 of the drawing. Also, the shape of the torque curve may be modified so that it is substantially flat in one part and steep in another or so that it has in all points, nearly the same slope, according to the effect desired. Thus the time required to trip the circuit breaker 3 may be definite, inverse, or inverse up to a predetermined value of current and definite for all values of current above the predetermined value.

The windings 13, although shown as closed circuit windings with no outside connection, may be connected in parallel relation to the circuit 2 if it is desired to operate the relay at a certain wattage instead of a certain current overload. The winding 9 is so proportioned that it will cause a sufficient field to be set up in proximity to the armatures only at a predetermined overload, so that the armatures will not creep on smaller overloads. The pole pieces 15 may be arranged so that those on one side of the core member 8 may become saturated at certain overloads, and the others remain unsaturated, or they may all be arranged to become saturated at predetermined overloads, thus insuring a relatively large flexible adjustment. The ratio of the gearing may be such that an indefinitely long time limit may be secured.

While I have described my invention in its preferred forms, I desire it to be understood that structural modifications may be made within the spirit of the same without departing from the scope of the appended claims.

I claim as my invention:

1. A motor comprising an armature, a field magnet core having a polar projection adjacent to the armature, a main field magnet winding, an auxiliary winding surrounding said polar projection, and an auxiliary pole piece projecting laterally from the polar projection adjacent to the armature, the said auxiliary pole piece being adapted to become so saturated that the armature will develop a substantially constant torque for all values of current traversing the main field magnet winding.

2. A motor comprising an armature, a field magnet core having a plurality of polar projections adjacent to the armature, a main field magnet winding, an auxiliary winding upon one of the polar projections of the field magnet core, an auxiliary pole piece projecting laterally from one side of a polar projection and adapted to become saturated when comparatively large amounts of current traverse the main field magnet winding, and another auxiliary pole piece that projects laterally from the other side of a polar projection of the field magnet core and adapted to become saturated under predetermined conditions to an amount differing from the saturation of the first mentioned auxiliary pole piece.

3. A motor comprising an armature, a field magnet core having a divided pole piece adjacent to the armature, a main field magnet winding, an auxiliary winding upon one of the polar divisions of the field magnet core, and auxiliary pole pieces projecting laterally from opposite sides of the main pole pieces.

4. A relay comprising an armature, a magnetizable core having a main divided pole piece adjacent the armature, a main winding, an auxiliary winding surrounding one of the polar divisions of the magnetizable core, and auxiliary pole pieces projecting laterally from opposite sides of the main pole pieces, the said auxiliary pole pieces being adjustable relatively to the armature.

5. A motor comprising an armature, a field magnet core having a polar projection adjacent to the armature, a main field magnet winding, an auxiliary closed-circuit winding surrounding said polar projection, and an auxiliary pole piece projecting laterally from the polar projection.

6. A motor comprising an armature, a field magnet core having a divided main pole piece adjacent to the armature, a main field magnet winding, an auxiliary closed-circuit winding surrounding one of the polar divisions of the field magnet core, and auxiliary pole pieces projecting laterally from opposite sides of the field magnet, the said auxiliary pole pieces being disposed unequal distances from the armature and one of them being adapted to become saturated when relatively large amounts of current traverse the main field magnet winding.

7. A motor comprising an armature, a field magnet core having a divided pole piece adjacent to the armature, a main field magnet winding, an auxiliary closed-circuit winding surrounding one of the polar divisions of the field magnet core, and auxiliary adjustable pole pieces projecting laterally from the field magnet and adapted to become saturated when the current traversing the main field magnet winding exceeds a predetermined value.

8. A motor comprising an armature, a field magnet core having a divided pole piece adjacent to the armature, a main field magnet winding, an auxiliary closed-circuit winding surrounding one of the polar divisions of the field magnet core, and an adjustable auxiliary pole piece projecting laterally from the field magnet core and adapted to become saturated when the current traversing the main field magnet winding exceeds a predetermined value.

In testimony whereof, I have hereunto subscribed my name this day of Feb. 28, 1914.

HAROLD W. BROWN.

Witnesses:
S. E. BANKS,
JAS. R. ROBINSON, Jr.